(12) United States Patent
Dondaine et al.

(10) Patent No.: US 11,248,649 B2
(45) Date of Patent: Feb. 15, 2022

(54) BEARING WITH AT LEAST ONE SEGMENTED RING AND ASSEMBLY PLATES

(71) Applicant: Aktiebolaget SKF, Gothenburg (SE)

(72) Inventors: Herve Dondaine, Avallon (FR); Joshua Oliveira, Lucy-sur-cure (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/072,150

(22) Filed: Oct. 16, 2020

(65) Prior Publication Data
US 2021/0131490 A1 May 6, 2021

(30) Foreign Application Priority Data
Nov. 6, 2019 (DE) .......................... 102019217085.4

(51) Int. Cl.
*F16C 19/38* (2006.01)
*F16C 19/50* (2006.01)
*F16C 19/54* (2006.01)
*F16C 33/60* (2006.01)

(52) U.S. Cl.
CPC .......... *F16C 19/381* (2013.01); *F16C 19/505* (2013.01); *F16C 19/545* (2013.01); *F16C 33/605* (2013.01); *F16C 2226/62* (2013.01); *F16C 2300/14* (2013.01); *F16C 2360/31* (2013.01)

(58) Field of Classification Search
CPC .... F16C 19/381; F16C 19/505; F16C 19/545; F16C 33/60; F16C 33/605; F16C 43/04; F16C 2226/60; F16C 2226/62; F16C 2300/14; F16C 2352/00; F16C 2360/31

USPC ....... 384/452, 502, 540, 542, 548, 563, 570, 384/579, 545
See application file for complete search history.

(56) References Cited

U.S. PATENT DOCUMENTS

| | | | | |
|---|---|---|---|---|
| 3,958,847 A | * | 5/1976 | Cain | F16C 33/60 384/504 |
| 2009/0324151 A1 | * | 12/2009 | Craig | F16C 19/52 384/448 |
| 2016/0025136 A1 | * | 1/2016 | Bouron | F16C 19/505 384/570 |
| 2019/0242434 A1 | * | 8/2019 | Oliveira | F16C 33/605 |

FOREIGN PATENT DOCUMENTS

| | | | | | |
|---|---|---|---|---|---|
| CN | 101389872 A | * | 3/2009 | | F16C 41/04 |
| CN | 201228727 Y | * | 4/2009 | | F16C 19/28 |
| CN | 207093712 U | * | 3/2018 | | F16H 55/17 |
| CN | 111059153 A | * | 4/2020 | | F16C 33/605 |

(Continued)

*Primary Examiner* — Marcus Charles
(74) *Attorney, Agent, or Firm* — Garcia-Zamor Intellectual Property Law; Ruy Garcia-Zamor; Bryan Peckjian

(57) ABSTRACT

The bearing provides an outer ring and an inner ring capable of rotating concentrically relative to one another. At least one of the inner and outer rings are split into a plurality of successive circumferential ring segments. Each pair of adjacent successive ring segments of the split-ring is secured together with at least one fixing plate. The fixing plate is disposed inside a first groove disposed on one of the ring segments and a second groove 38 disposed on the other ring segment. The fixing plate is set back or flush with at least the surface of each of the ring segments from which the first or second groove is formed.

10 Claims, 5 Drawing Sheets

(56) References Cited

FOREIGN PATENT DOCUMENTS

| DE | 2648144 A | * | 4/1978 | ............ F16C 19/381 |
| DE | 102007062145 A1 | * | 6/2009 | .............. F16C 33/62 |
| DE | 102010049953 A1 | * | 4/2012 | .............. F16C 33/58 |
| DE | 102016116113 A1 | * | 3/2018 | .............. F16C 19/52 |
| DE | 202017000692 U1 | * | 5/2018 | ............ F16C 19/181 |
| DE | 102017110973 A1 | * | 11/2018 | ......... F16C 33/7886 |
| DE | 202018102121 U1 | * | 7/2019 | ......... F16C 33/6696 |
| DE | 102019202234 B4 | * | 12/2020 | .............. F16C 33/60 |
| EP | 2829758 A1 | * | 1/2015 | .............. F16C 43/04 |

* cited by examiner

BEARING WITH AT LEAST ONE SEGMENTED RING AND ASSEMBLY PLATES

CROSS-REFERENCE TO RELATED APPLICATIONS

This application claims priority to German Patent Application no. 102019217085.4, filed Nov. 6, 2019, the contents of which is fully incorporated herein by reference.

TECHNICAL FIELD OF THE INVENTION

The present invention relates to the field of bearings. The invention notably relates to the field of large-diameter rolling bearings that can accommodate axial and radial loads, and having an inner ring and an outer ring arranged concentrically about an axis of rotation running in an axial direction.

BACKGROUND OF THE INVENTION

Such large-diameter rolling bearings may be used for example in a tunnel boring machine, in a mining extraction machine or in a wind turbine. Large-diameter rolling bearings may also be used in the field of defense such as radars or chars.

A large-diameter rolling bearing comprises generally two concentric inner and outer rings, and at least one row of rolling elements, such as rollers, radially interposed between the rings.

In some fields of applications, the rolling bearing is delivered with inner and outer rings formed as split-rings in order to allow the transport, and/or the assembly on the corresponding machine. In such case, each of the inner and outer rings is split into a plurality of successive circumferential ring segments.

Therefore, after delivery, the ring segments must be joined together to assemble each split-ring.

Classically, during this assembly of each split-ring, flanges are used to secure together the successive ring segments. Each end of each ring segment is secured to the facing end of the successive ring segment with one flange. For example, the flanges may be secured onto one of the frontal faces of the split-ring.

Such flanges axially protrude with respect to this frontal face of the split-ring. This increases the overall dimension of the rolling bearing.

One aim of the present invention is to overcome this drawback.

SUMMARY OF THE INVENTION

The invention relates to a bearing comprising an outer ring and an inner ring capable of rotating concentrically relative to one another, at least one of the inner and outer rings being split into a plurality of successive circumferential ring segments.

According to a general feature, each pair of adjacent successive ring segments of the split-ring is secured together with at least one fixing plate.

According to another general feature, the fixing plate is disposed inside a first groove provided on one of the ring segments and inside a second groove provided on the other ring segment.

The fixing plate is set back or flush with at least the surface of each of the facing ring segments from which the first or second groove is formed.

Thanks to the invention, the fixing plates do not protrude with respect this surface of each ring segment provided with the groove. Accordingly, the overall dimension of the bearing is reduced.

Otherwise, the fixing plates may be made from a rigid material, such as steel. This improve the rigidity of the bearing.

Preferably, the fixing plate is set back or flush with the split-ring.

Advantageously, the bearing further comprises at least first and second alignment members extending through the fixing plate. The first alignment member protrudes into a recess formed into the thickness of on one of the ring segments, and the second alignment member protrudes into a recess formed into the thickness of the other ring segment.

With such an arrangement, the ring segments of the split-ring may be easily and perfectly aligned at least in the axial direction during re-assembly, for example after the transport, with regard to its initial position during fabrication.

The use of alignment members inserted into recesses facilitates the re-assembly process. As a matter of fact, with a conventional bearing, during re-assembly, the ring segments may not be aligned in the axial direction. In this case, the re-assembly process of the bearing is interrupted until the ring segments are disassembled and then realigned.

Preferably, the first and second alignment members are set back or flush with an outer surface of the fixing plate which is located on the side opposite to the first and second grooves of the ring segments. For example, each of the first and second alignment members may comprise a pin.

In one embodiment, the bearing further comprises at least one first fixing screw and at least one second fixing screws extending through the fixing plate. The first fixing screw is engaged inside a threaded hole formed onto one of the ring segments, and the second fixing screw is engaged inside a threaded hole formed onto the other ring segment. The threaded holes may be formed from the bottom of the associated groove.

The first and second fixing screws are distinct from the first and second alignment members.

Preferably, screw heads of the first and second fixing screws are set back or flush with an outer surface of the fixing plate which is located on the side opposite to the first and second grooves of the ring segments.

In one embodiment, the first and second grooves may be provided on the outer cylindrical surfaces of the ring segments delimiting at least partly the outer cylindrical surface of the split-ring.

Alternatively, the first and second grooves may be provided on the inner cylindrical surfaces of ring segments delimiting at least partly the inner cylindrical bore of the split-ring.

In another embodiment, the first and second grooves may be provided on frontal faces of the ring segments delimiting at least partly a frontal face of the split-ring.

In one embodiment, the bearing further comprises at least one row of rolling elements arranged between raceways provided on the inner and outer rings. The bearing may comprise at least one row of axial rolling elements arranged between radial raceways provided on the inner and outer rings, and at least one row of radial rolling elements arranged between axial raceways provided on the inner and outer rings.

BRIEF DESCRIPTION OF THE DRAWINGS

The present invention and its advantages will be better understood by studying the detailed description of a specific embodiment given by way of a non-limiting example and illustrated by the appended drawings on which.

DETAILED DESCRIPTION OF THE INVENTION

Figure 1:
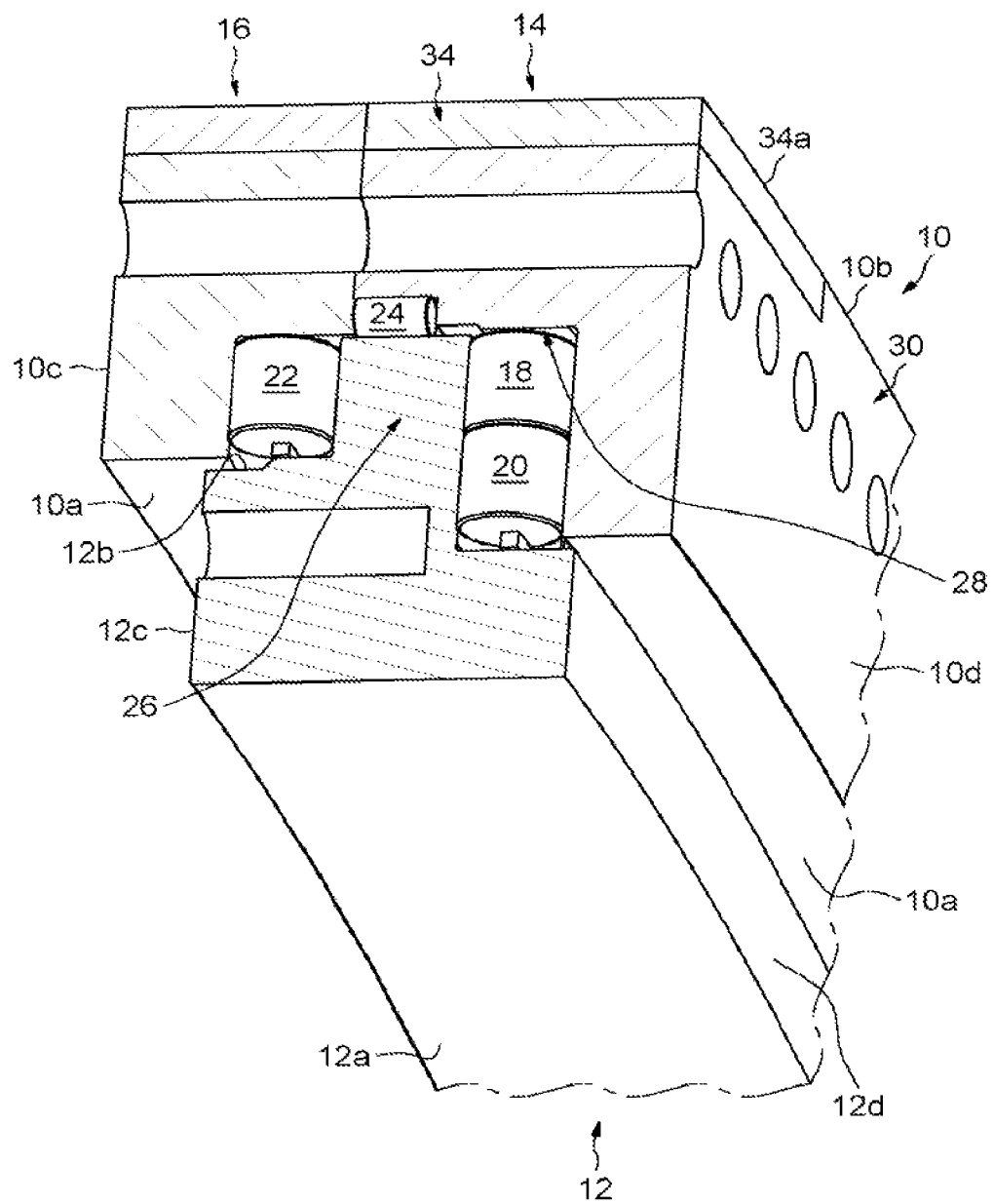
FIG. 1 is a partial cross-section of a rolling bearing according to a first example of the invention.

The rolling bearing as illustrated on FIG. 1 is a large-diameter rolling bearing comprising an outer ring 10 and an inner ring 12. The rolling bearing may for example be used in a tunnel boring machine, a wind turbine or any other applications using a large diameter rolling bearing.

The outer and inner rings 10, 12 are concentric and extend axially along the bearing rotation axis (not shown) which runs in an axial direction. The rings 10, 12 are of the solid type.

The outer ring 10 is formed as a split-ring and comprises a first ring 14 and a second ring 16 stacked one relative to the other in the axial direction. Each of the first and second rings 14, 16 of the outer ring is provided with a plurality of aligned through-holes (not referenced) in order to be joined by fitting bolts.

As will be described later, the outer ring 14 is also formed as a split-ring in the circumferential direction.

In the illustrated example, the rolling bearing comprises three rows of axial rollers 18, 20, 22 which are arranged between the outer and inner rings 10, 12 in order to form an axial thrust, and a row of radial rollers 24 which are arranged between the rings to form a radial thrust.

The rollers 18 to 24 of one row are identical to one another. The axis of rotation of each roller 24 is parallel to the axis of the bearing and perpendicular to the axes of each or the rollers 18, 20 and 22. In the illustrated example, the row of rollers 18 is superimposed on the row of rollers 20. In the illustrated example, the diameter of the rollers 24 is smaller than the diameter of the rollers 18 to 22.

The inner ring 12 comprises an annular protruding nose 26 engaging into an annular groove 28 of the outer ring. The nose 26 extends radially outwards. The groove 28 opens in a radial direction inwardly towards the inner ring 12.

The inner ring 12 also comprises an inner cylindrical bore 12a and a stepped outer cylindrical surface 12b which is radially opposite to the bore 12a. The protruding nose 26 protrudes radially from the outer cylindrical surface 12b. The inner ring 12 further comprises two opposite radial frontal surfaces 12c, 12d which axially delimit the bore 12a and the outer cylindrical surface 12b.

The rows of rollers 18 to 22 are arranged axially between the nose 26 of the inner ring and the groove 28 of the outer ring. The rows of rollers 18, 20 and the row of rollers 22 are disposed on each side of the nose 26 of the inner ring.

The rollers 24 are arranged radially between raceways formed on the nose 26 and the groove 28. The row of rollers 24 is radially offset outwards with respect to the rows of rollers 18 to 22. The row of rollers 24 is axially located between the rows of rollers 18 to 22.

The outer ring 10 comprises an inner stepped cylindrical surface or bore 10a from which the groove 28 is formed. The outer ring 10 also comprises an outer cylindrical surface 10b which is radially opposite to the bore 10a. The outer ring 10 further comprises two opposite radial frontal surfaces 10c, 10d which axially delimit the bore 10a and the outer surface 10b of the ring.

As previously mentioned, the outer ring 10 is also divided in the circumferential direction. Each of the first and second rings 14, 16 of the outer ring is segmented. Since the designs of the two rings 14, 16 are similar, only the ring 14 will be described here.

Figure 2:
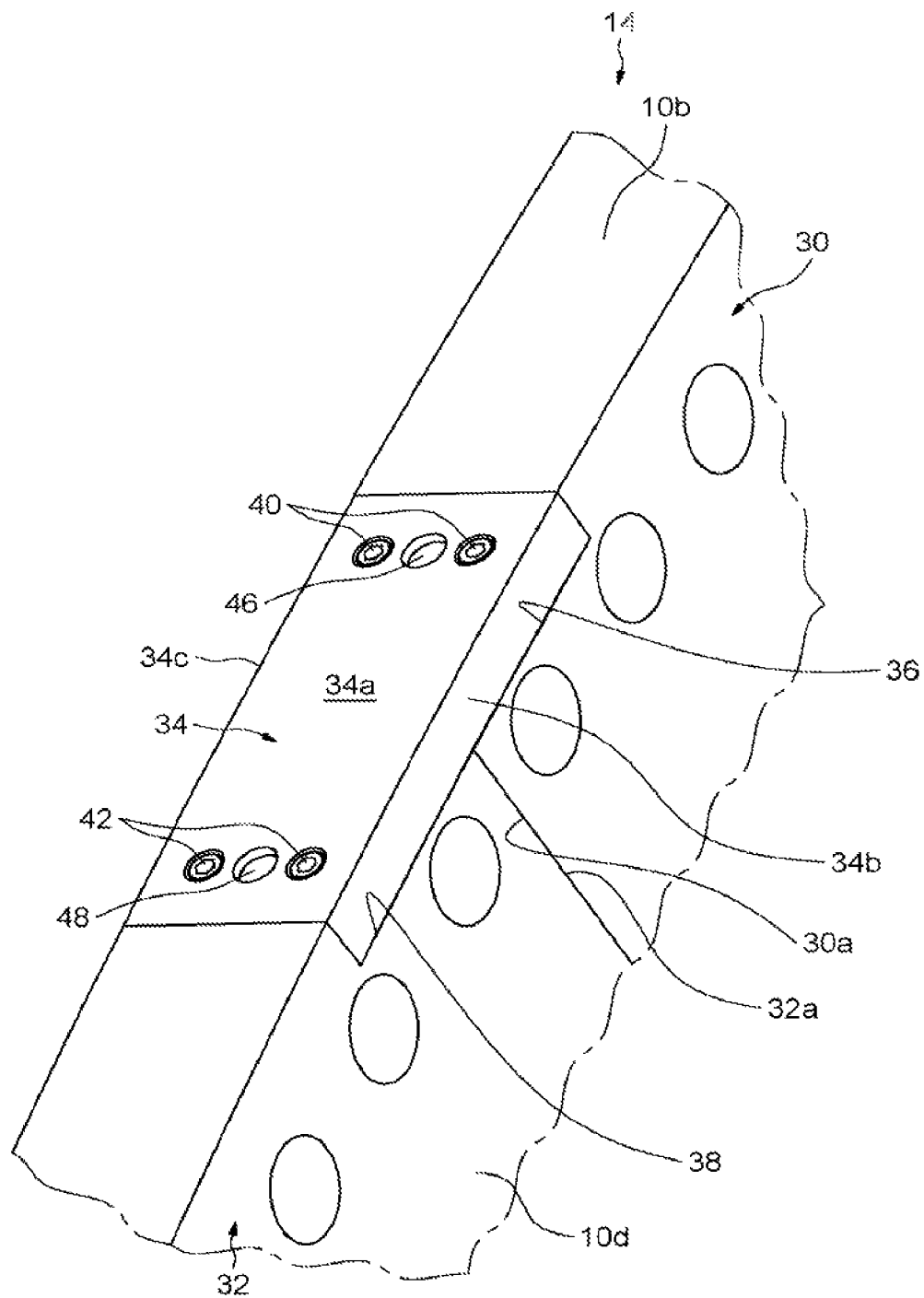
FIG. 2 is a partial perspective view of an outer ring of the rolling bearing of FIG. 1.

As shown on FIG. 2, the first ring 14 of the outer ring is formed by at two successive circumferential ring segments 30, 32. Alternatively, the first ring 14 may comprise at least three successive circumferential ring segments.

Each ring segment 30, 32 of the first ring 14 of the outer ring is provided with a first end 30a, 32a and with a second end (not visible) which delimit the ring segment in the circumferential direction. The first end 30a, 32a and the second end of each ring segment 30, 32 are opposite in the circumferential direction.

In the illustrated example, the first ends 30a, 32a of the ring segments 30, 32 face each other and abut in the circumferential direction. Similarly, the second ends of the ring segments 30, 32 also face each other and abut in the circumferential direction.

The ring segments 30, 32 forming the first ring 14 may be identical one to another. The outer cylindrical surface of each ring segment 30, 32 delimits partly the outer surface 10b of the outer ring. One of the frontal surfaces of each ring segment 30, 32 delimits partly the frontal surface 10d of the outer ring.

The outer ring 10 is also provided with a plurality of fixing plates 34 to secure together the successive ring segments 30, 32. Each fixing plate 34 secures together each pair of facing end portions of two successive ring segments 30, 32. On FIG. 2, only one fixing plate 34 is visible. The number of fixing plates 34 is equal to the number of successive circumferential ring segments.

The mounting of one fixing plate 34 will be described here, it being understood that the mounting of the other fixing plate(s) 34 is identical.

Figure 3A:
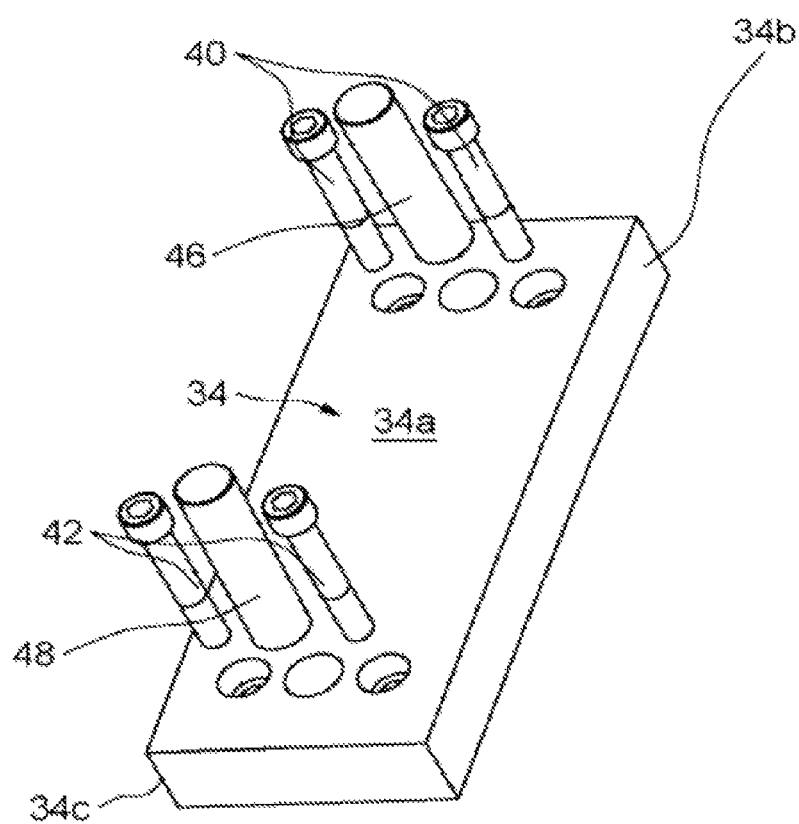
FIG. 3a is a partial perspective view of a fixing plate of FIG. 2.
Figure 3B:
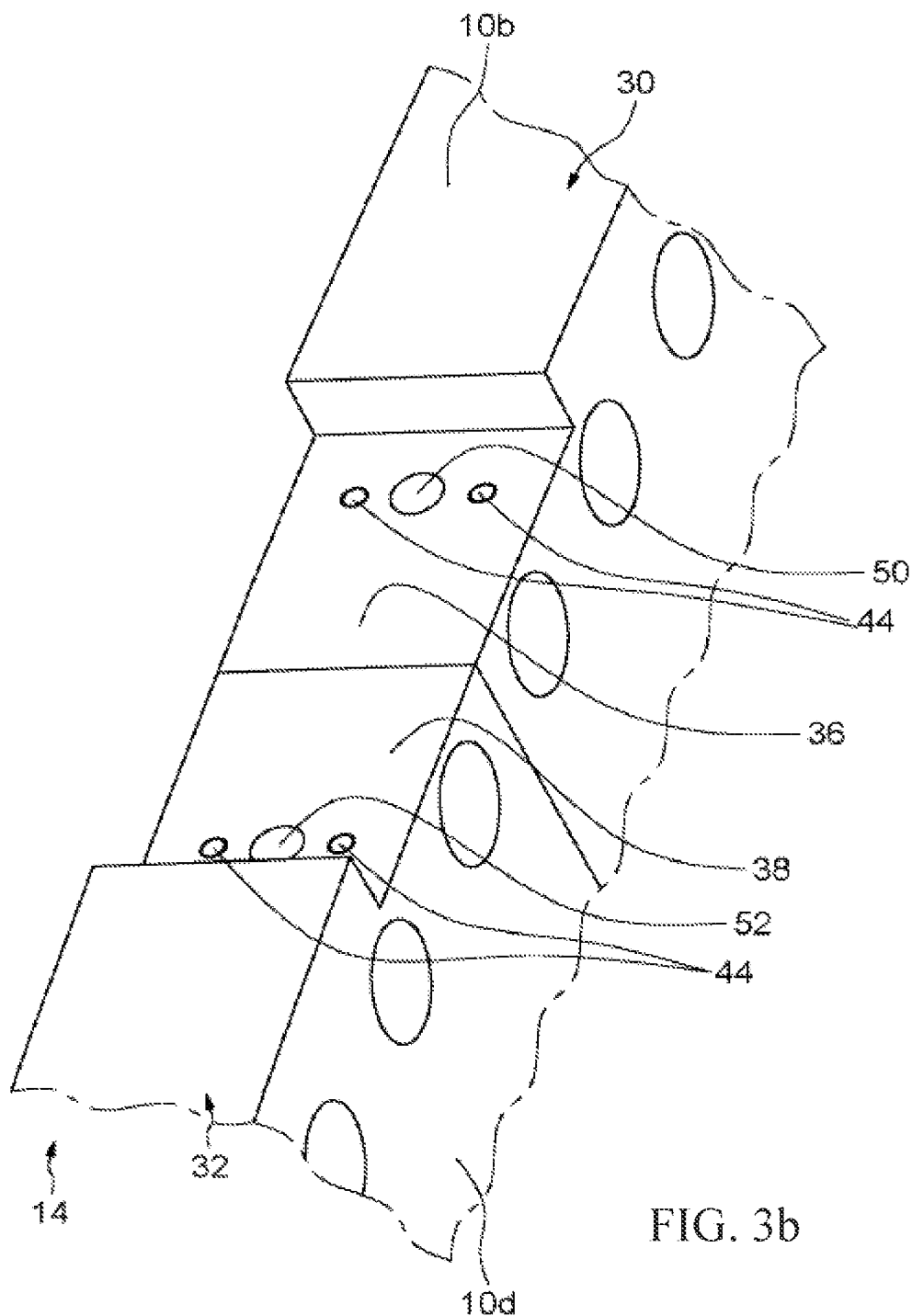
FIG. 3b is a partial perspective view of two successive ring segments of FIG. 2.

As shown more clearly in FIGS. 3a and 3b, first and second grooves 36, 38 are respectively formed on the ring segments 30, 32 of the first ring 14 of the outer ring.

The first groove 36 is formed on the outer surface of the ring segment 30. The groove 36 opens on the first end 30a in the circumferential direction. In the illustrated example, the groove 36 extends on the whole width of the outer surface of the ring segment 30. Alternatively, the groove 36 may have a reduced width.

The second groove 38 is formed on the outer surface of the ring segment 32. The groove 38 opens on the first end 32a in the circumferential direction. The groove 38 faces the groove 36 of the ring segment 30 in the circumferential direction. In the illustrated example, the groove 38 is identical to the groove 36. Alternatively, the grooves 36, 38 may have different shapes and/or dimensions.

As will be described later, the fixing plate 34 is entirely housed inside the grooves 36, 38 of the ring segments 30, 32. The fixing plate 34 is mounted radially against the bottoms of the grooves 36, 38.

The rolling bearing also comprises first and second screws 40, 42 to fix the fixing plate 34 inside the grooves 36, 38 of the ring segments 30, 32. In the illustrated example, the rolling bearing comprises two first screws 40 and two second screws 42. Alternatively, it could be possible to foresee a different number of first and second screws 40, 42.

Each of the first screw 40 extends through the fixing plate 34 and is engaged inside a threaded hole 44 formed from the bottom of the groove 36. Each threaded hole 44 extends axially into the thickness of the ring segment 30. The first screws 40 secure the fixing plate 34 onto the ring segment 30.

Each of the first screws 40 extend through the fixing plate 34 and are engaged inside a threaded hole 46 formed from the bottom of the 30 groove 38. Each threaded hole 44 extends axially into the thickness of the ring segment 32. The first screws 40 secure the fixing plate 34 onto the ring segment 32.

The rolling bearing further comprises first and second pins 46, 48 extending through the fixing plate 34 and protruding respectively into first and second recesses 50, 52 formed on the ring segments 30, 32. The first recess 50 is formed from the bottom of the groove 36. The second recess 52 is formed from the bottom of the groove 38. The first and second recesses 50, 52 extend radially.

Each pin 46, 48 is entirely housed inside the fixing plate 34 and the associated recess 50, 52. In the illustrated example, each pin 46, 48 is set back with respect to the outer surface 34a of the fixing plate which is located radially on the side opposite to the first and second grooves 36, 38.

The shape of each recess 50, 52 is complementary to that of the associated pin 46, 48. In the disclosed example, each pin 46, 48 has a cylindrical shape. Alternatively, each pin 46, 48 may have different cross-sections shapes, for example rectangular, square, etc. Each pin 46, 48 is secured inside the associated recess 50, 52 by any appropriate means, for example by press-fitting.

As previously mentioned, the fixing plate 34 is entirely housed inside the grooves 36, 38 of the ring segments 30, 32 of the first ring 14 of the outer ring. In other words, the fixing plate 34 does not protrude with respect the ring segments 30, 32. In the illustrated example, the outer surface 34a of the fixing plate is flush with the outer cylindrical surface of each ring segment 30, 32. Each frontal face 34b, 34c of the fixing plate is flush with one of the frontal surfaces of each ring segment 30, 32. In this example, the frontal faces 34b, 34c of the fixing plate delimits axially the outer surface 34a.

The overall dimension of the rolling bearing is not increased by the fixing plate 34. In order to not increase the overall dimension of the rolling bearing, in the illustrated example, the pins 46, 48 and the screw heads of screws 40, 42 are also set back with the outer surface 34a of the fixing plate.

In this illustrated example, the grooves 36, 38 are provided on the outer cylindrical surfaces of the ring segments 30, 32 delimiting partly the outer surface 10b of the outer ring, and the outer surface 34a of the fixing plate 34 plate is flush with these outer cylindrical surfaces.

Figure 4:
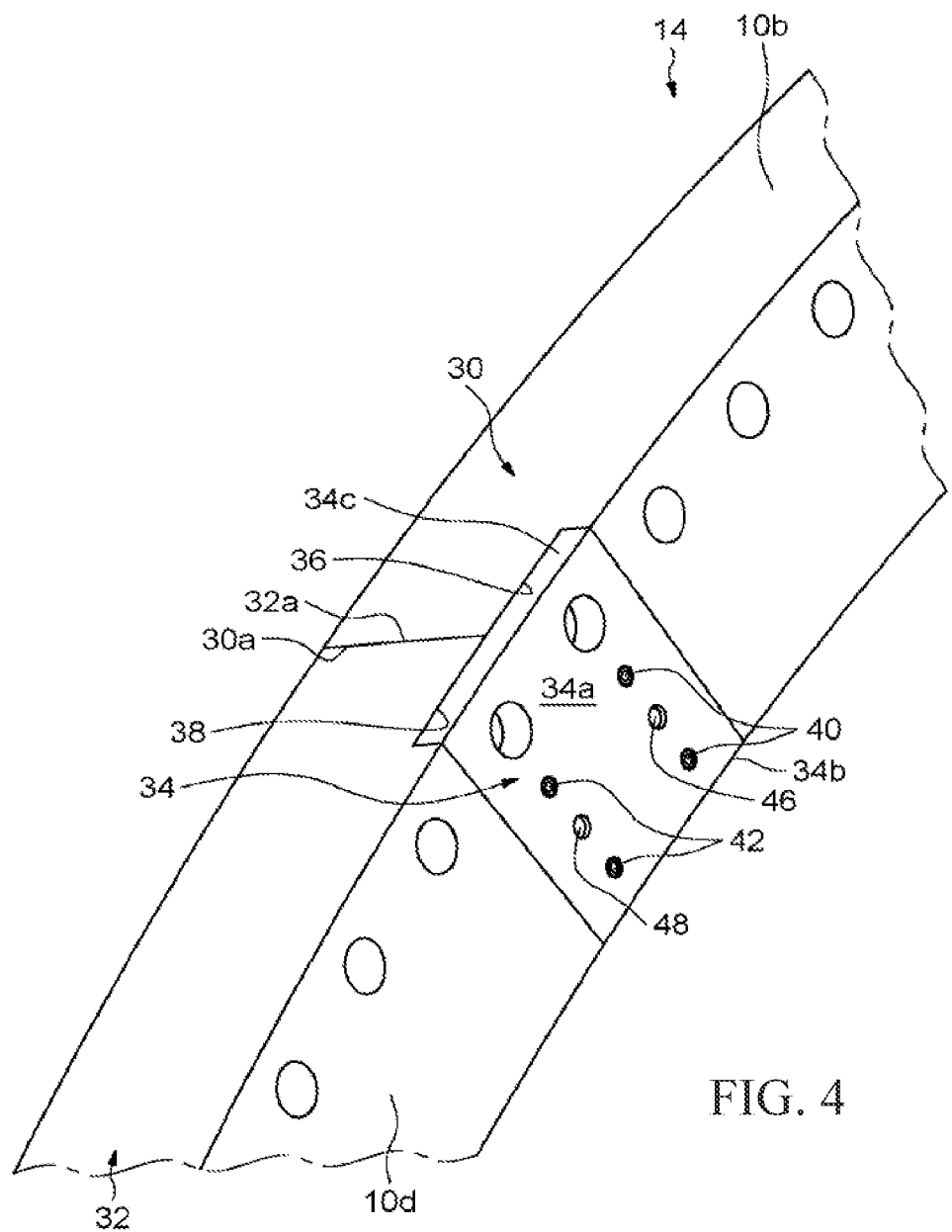
FIG. 4 is a partial perspective view of an outer ring of a rolling bearing according to a second example of the invention.

Alternatively, in the example shown on FIG. 4, in which identical parts are given identical references, the grooves 36, 38 are provided on the frontal surfaces of the ring segments 30, 32 delimiting partly the frontal surface 10d of the outer ring. Here, the outer surface 34a of the fixing plate 34 plate is flush with these frontal surfaces of the ring segments 30, 32. In this example, the frontal faces 34b, 34c of the fixing plate delimits radially the outer surface 34a. In the illustrated example, the fixing plate 34 is also provided with through-holes (not referenced) aligned with the through-holes of the first ring 14 used to join the first ring and the associated second ring (not shown).

In the illustrated example, the outer ring 10 is formed as a split-ring in the axial direction. Alternatively, according to the design of the rolling bearing, the outer ring 10 may be not segmented in the axial direction, but only in the circumferential direction.

In the previous described examples, only the outer ring 10 is segmented in the circumferential direction. Alternatively or in combination, the inner ring may also be formed as a split-ring comprises at least two successive circumferential ring segments. In this case, the first and second grooves 36, 38 may be provided on the inner cylindrical surfaces of the ring segments delimiting at least partly the bore of the inner split-ring, or on the frontal surfaces of the ring segments delimiting partly the frontal surface of the inner split-ring.

In the described examples, the rolling bearing is provided with three rows of rolling elements. Alternatively, the rolling bearing may comprise only one row of rolling elements, or two rows of rolling elements, or four or more rows of rolling elements. In the illustrated example, the rolling elements are rollers. The rolling bearing may comprise other types of rolling elements, for example balls. In another variant, the bearing may also be a sliding bearing having no rolling elements.

The invention claimed is:

1. A bearing comprising:
    an outer ring, and
    an inner ring capable of rotating concentrically relative to one another, at least one of the inner and outer rings being split into a plurality of successive circumferential ring segments, wherein
    adjacent successive circumferential ring segments of the plurality of successive circumferential ring segments are secured together with at least one fixing plate, the fixing plate being disposed inside a first groove provided on one of the ring segments and a second groove provided on the other ring segment, the fixing plate being set back or flush with at least the surface of each of the ring segments from which the first or second groove is formed.

2. The bearing according to claim 1, wherein a plate circumferential outermost surface of the fixing plate is radially inward or flush with a ring circumferential outermost surface of the split-ring.

3. The bearing according to claim 1, further comprising at least first and second alignment members extending through the fixing plate, the first alignment member protruding into a recess formed into the thickness of one of the ring segments, and the second alignment member protruding into a recess formed into the thickness of the other ring segment.

4. The bearing according to claim 3, wherein the first and second alignment members are radially inward or flush with an outer surface of the fixing plate which is located on the side opposite to the first and second grooves of the ring segments.

5. The bearing according to claim 3, wherein each of the first and second alignment members comprises a pin.

6. The bearing according to claim 1, further comprising at least one first fixing screw and at least one second fixing screw extending through the fixing plate, the first fixing screw being engaged inside a threaded hole formed onto one of the ring segments, and the second fixing screw being engaged inside a threaded hole formed onto the other ring segment.

7. The bearing according to claim 6, wherein screw heads of the first and second fixing screws are set back or flush with an outer surface of the fixing plate which is located on the side opposite to the first and second grooves of the ring segments.

8. The bearing according to claim 1, wherein the first and second grooves are provided on the outer cylindrical surfaces of the ring segments delimiting at least partly the outer cylindrical surface of the split-ring, or are provided on the inner cylindrical surfaces of the ring segments delimiting at least partly the inner cylindrical bore of the split-ring.

9. The bearing according to claim 1, wherein the first and second grooves are provided on frontal faces of the ring segments delimiting at least partly a frontal face of the split-ring.

10. The bearing according to claim 1, wherein the fixing plate is made from steel.

* * * * *